United States Patent [19]

Lantto et al.

[11] Patent Number: 5,537,457
[45] Date of Patent: Jul. 16, 1996

[54] METHOD FOR HANDLING CALLS TO A NON-REGISTERED MOBILE SUBSCRIBER IN A MOBILE TELEPHONE SYSTEM

[75] Inventors: Sven J. Lantto, Tullinge; Mats O. Stille, Stockholm; Mats W. Gandils, Älvsjö; Bo A. V. Åström, Tullinge, all of Sweden; Ari Peltonen, Aachen, Germany

[73] Assignee: Telefonaktiebolaget LM Ericsson, Stockholm, Sweden

[21] Appl. No.: 249,989

[22] Filed: May 27, 1994

[30]    Foreign Application Priority Data

May 28, 1993 [SE] Sweden ................................ 9301837

[51] Int. Cl.⁶ ............................................ H04Q 7/38
[52] U.S. Cl. ..................... 379/58; 379/59; 455/33.1
[58] Field of Search ............................ 379/59, 60, 58, 379/63, 211, 221; 455/33.1, 33.2, 54.1, 54.2

[56]    References Cited

U.S. PATENT DOCUMENTS 5,153,902  10/1992  Buhl et al. ................................ 379/57

FOREIGN PATENT DOCUMENTS

WO92/13428  8/1992  WIPO .

OTHER PUBLICATIONS

"The GSM System for Mobile Communications", Michel Mouly et al., pp. 460–479, 508–529; 1992.
"Straw Man for Automatic Roaming", Proposal, Electronic Industries Association, Jun. 1985.
"Cellular Radio–Telecommunications Intersystem Operations: Automatic Roaming", EIA/TIA Interim Standard, pp. 12–13, Dec. 1991.
M. Ballard et al., "Cellular Mobile Radio as an Intelligent Network Application," Electrical Communication, vol. 63, No. 4, pp. 389–399 (1989).
I. Brini et al., "International Roaming in Digital Cellular Networks," CSELT Technical Reports, vol. XX, No. 6, pp. 531–536 (Dec. 1992).
GSM Technical Specification GSM 03.12, version 3.3.0, "Location Registration Procedures".
CCITT Recommendation Q.1051, pp. 3–13, 75–108.
CCITT Recommendation Q.763, pp. 208–219—(ISUP (ISDN User Part)).

*Primary Examiner*—Curtis Kuntz
*Assistant Examiner*—William G. Trost
*Attorney, Agent, or Firm*—Burns, Doane, Swecker & Mathis

[57]    ABSTRACT

A method for handling calls to a terminal in a mobile telephone system of the kind in which the call is handled by an ISUP/IAM message which has a static relationship between the address of the visitor location register in the network in which the terminal roams, and the unique terminal identity. If the visitor location register has no data record relating to the unique identity, an attempt is made to collect from the home location register of the called subscriber the data that is required to complete the connection, this data being stored in the visitor location register. If the attempt is successful and the called subscriber is active, the connection is set up in a known manner with the aid of this data.

13 Claims, 3 Drawing Sheets

METHOD FOR HANDLING CALLS TO A NON-REGISTERED MOBILE SUBSCRIBER IN A MOBILE TELEPHONE SYSTEM

BACKGROUND

The present invention relates to a method for handling calls to a non-registered terminal in a mobile telephone system, and then particularly in a system which operates without specific roaming numbers.

A public mobile telephone system that is intended to cover a wide area requires the application of advanced procedures to enable a call to a roaming subscriber to be directed to that radio base station which is in contact with the mobile telephone of the subscriber at that moment in time. Since fixed telephone networks, ISDN-networks and possibly other public land mobile telephone networks may be involved in setting up a single call connection, it is important that each point in the system can be quickly provided with information relating to the whereabouts of the roaming subscriber. Consequently, comprehensive signalling is required in order to keep the information in the system current and up to date.

Known mobile telephone systems are NMT (Nordic Mobile Telephone System), TACS (Total Access Mobile Telephone System) and AMPS (Advanced Mobile Phone Service), all of which are based on analog techniques, and GSM (Group Special Mobile), ADC (American Digital Cellular) and PDC (Personal Digital Cellular). NMT and TACS are described for instance in CMS88 Cellular Mobile Telephone System, ERICSSON document EN/LZT 101 908 R2, 1988, whereas the GSM-system is described in CME 20 System, ERICSSON document EN/LZT 120 226 R2A, 1991. ADC is described in the standardization document EIA/TIA IS 54, 55 and 56 and the network part in PDC is described in the standard Internode Specifications for Digital Mobile Communications Network, Ver. 3.2.

These mobile telephone systems use mobile services switching centres which are each connected to a number of radio base stations and which maintain contact with mobile subscribers roaming within the areas covered by said mobile services switching centres. These switching centres are connected to means, visitor registers, which keep an account of which subscribers are located within the service area of respective centres. The visitor location register may be common to a number of mobile services switching centres or each mobile services switching centre may be connected to an own visitor location register. A common visitor location register can cover the whole of a mobile telephone network.

Each subscriber is registered in a register in the network in which he/she is at home. The home location register contains subscriber related data, for instance mobile and subscriber authenticating data, and also data which discloses the location of the subscriber. For instance, if the subscriber roams into a network other than his home network, a reference is found to the visitor location register in this network, this reference having been transferred in a localization message in conjunction with the subscriber identifying himself when entering the new network. When making a call to a mobile station, each network is reached through a special gateway mobile services switching centre which with the aid of data in the address message of an external call collects information relating to the data record of the called subscriber from his home location register. The location of the subscriber in the network can then be traced with the aid of this information, therewith enabling a call connection to be set up. Paging and reporting are effected by means of signalling carried out with signalling protocol according to CCITT No. 7, Common Channel Signalling. The protocol MAP (Mobile Application Part) specified in CCITT recommendation Q.1051 is used between the gateway mobile services switching centre and the home location register and also between the home location register and the visitor location register, while the protocol ISUP (ISDN User Part) is used for signalling between the gateway mobile services switching centre and the mobile services switching centre and the visitor location register.

Normally, paging is effected in the known mobile telephone systems with the aid of a roaming number. A roaming number is, in principle, a telephone number which points to the data record of the subscriber in the visitor location register in which the subscriber is registered. In some systems, for instance the Japanese digital telephone system PDC whose network part has been standardized by I-Node Group (Internode Specifications—Digital Mobile Telecommunications Network, Ver. 3.2, 1992) a roaming number is also sent to the home location register immediately when a subscriber registers himself/herself. This roaming number is allocated by the network but does not belong to any specific subscriber, and the subscriber to which the roaming number has been allocated will normally retain the number while he roams in the service area of the visitor location register.

When a subscriber calls the mobile, by dialling the directory number of the subscriber, the call arrives at a gateway mobile services switching centre which handles incoming and outgoing signalling and traffic from the mobile network in which the called subscriber belongs. The number is analyzed and identifies the field in the home location register HLR in which all data concerning the subscriber is stored. The roaming number is read in the home location register and is then used to call the visitor location register within whose service area the subscriber is located. The roaming number is used to address the data record in the visitor location register in which the data of the called subscriber is registered. One drawback with the use of roaming numbers is that these numbers reduce the numbers in the numbering plan that are available as subscriber numbers. Another drawback is that a dynamic relationship exists between the roaming number and subscriber identity, because a roaming number points to different subscribers at different points in time, which makes it difficult to restore the information in the home and visitor location registers after an error or fault has occurred.

The Swedish Patent Application 9300721-9, which corresponds to commonly assigned U.S. patent application Ser. No. 08/205,154 filed Mar. 3, 1994, now U.S. Pat. No. 5,463,381, describes a method of identifying the location of a mobile subscriber which provides a direct connection with one of the numbers used in the system to clearly identify a subscriber, and which eliminates the aforesaid problems associated with roaming numbers. This is achieved by recording in the records of the subscriber in a home location register an identification number (PRN) which is unique for each visitor location register, and in the event of a call, using this number as the "CALLED ADDRESS" in an IAM-message in a ISUP-signal and by connecting to this message the subscriber directory number (MSN) and unique identification number (IMSI) which are used as a pointer to obtain access to the visitor location register GLR in which the subscriber is registered.

SUMMARY

In the case of the aforedescribed solution, the problem arises whereby a call to a mobile subscriber can be guided to a register GLR in which the subscriber whose unique identification number (IMSI) is found in the IAM-message is not registered. This may be due to different circumstances, for instance:

The visitor location register GLR may have been the subject of an error or a fault and has lost all data that relates to those subscribers roaming within its service area.

The home location register (HLR) may have been reset from a safety or back-up copy and transmitted a "RESET" message to all visitor location registers GLR in which subscribers from this home register HLR roam. This may result in the erasure of all data relating to these subscribers.

The traffic load within the service area of the visitor location register may be so high as to necessitate the register, for capacity reasons, to use a register record which has earlier been allocated to another subscriber. This other subscriber, however, may have been passive for a long period of time and consequently the register record is used instead to store data relating to some other, more active subscriber.

A visitor location register stores information relating to those mobile subscribers which roam in the service area for this specific register at that moment in time. On the other hand, a home location register stores all data for those mobile subscribers who belong to this register, irrespective of where these subscribers are located.

If a call arrives at a mobile subscriber whose registration in the register GLR has disappeared, such a call has hitherto not given rise to an error indication or an error call in the PDC-system. In a mobile telephone system in which signalling is ordered in accordance with those principles disclosed in Swedish Patent Application 9300721-9, it is, in many cases, possible to continue with the call and therefore reduce the number of unsuccessful calls.

This is achieved in accordance with the invention in the following way. If a call to a mobile subscriber arrives at the visitor location register determined by the field "CALLED ADDRESS" in the IAM-message and the unique subscriber number IMSI used as a pointer and found in the IAM-message is unable to find in the visitor location register data relating to the called mobile subscriber, the visitor location register sends a query to the home location register HLR in a MAP-message "SUBSCRIBER DATA REQUEST". This message contains the unique subscriber number IMSI of the called subscriber which directs the message to the correct home location register HLR and is used as a pointer to find the correct data record in the home location register. Subscriber data is sent from this data record to the visitor location register, where the data is stored in a data record with the unique subscriber number IMSI as an address. The mobile services switching centre now pages all of the base stations connected to the switching centre, using this subscriber data. If the mobile subscriber is active, he will respond to this paging and the call can be set up in a normal fashion.

BRIEF DESCRIPTION OF THE DRAWINGS

The invention will now be described in more detail with reference to the accompanying drawings, in which.

DETAILED DESCRIPTION

Figure 1:
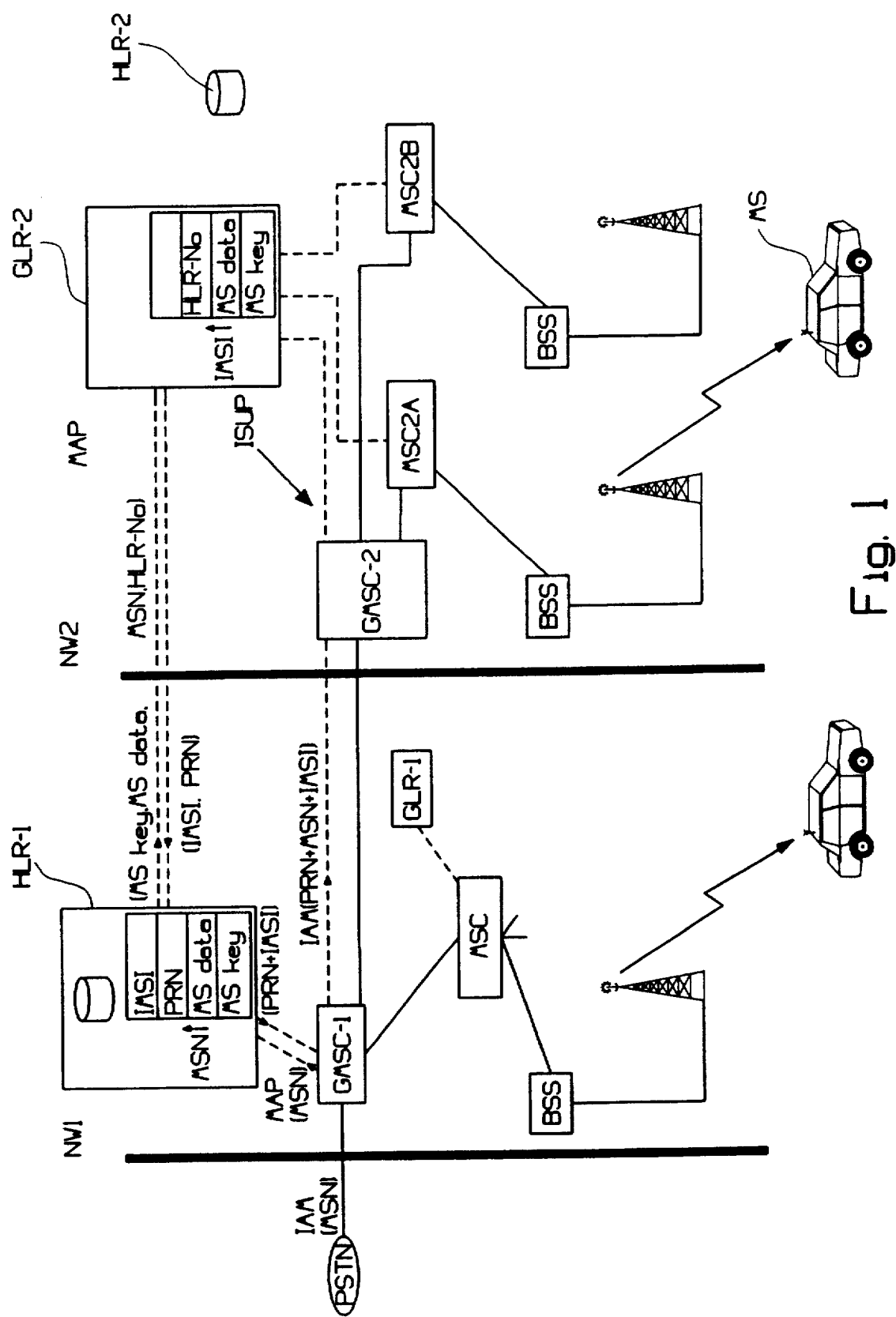
FIG. 1 illustrates schematically the construction of a mobile telephone system.

FIG. 1 illustrates schematically two public land mobile networks (PLMN) referenced NW1 and NW2. Each network includes a plurality of radio base stations BSS which are connected with those subscribers MS who roam within the network through a radio interface. A number of base stations BSS are served by a mobile services switching centre MSC which handles communication to and from the mobile subscribers MS. Each network includes at least one visitor location register GLR which stores data relating to those visiting subscribers who roam in the service area of the switching centre. Each visitor location register GLR serves one or more mobile services switching centres (MSC1, MSC2A, MSC2B). Each mobile services switching centre may possibly be integrated with a visitor location register. Each network will also include a further register, the home location register HLR. As opposed to the visitor location register GLR, the home location register HLR contains solely data which relates to those subscribers MS which are registered as belonging to the network. The home location register HLR may either be free-standing or integrated with a mobile services switching centre MSC.

Signalling between the network units is effected with the signal protocol MAP (Mobile Application Part) and ISUP defined within the framework of the CCITT Signalling System No. 7. MAP is a protocol particularly suited for supporting functions that are particular to mobile telephony and is utilized in the mobile services switching centre MSC, the visitor location register GLR, the home location register HLR and the gateway mobile switching centre GMSC, so as to enable their nodes to communicate with one another, for instance for registering and deregistering the locations of the mobile subscribers, for handover and for identifying and administrating subscriber data by updating the registers GLR and HLR. Communication concerning the establishment of a connection between the gateway mobile services switching centre GMSC and a mobile services switching centre MSC is effected in accordance with the protocol ISUP (ISDN User Part), where the message IAM (Initial Address Message) is of particular interest to the invention. Signalling channels have been identified in the Figure with broken lines, whereas message channels have been identified with full lines. Communication between the mobile subscribers and the mobile services switching centre is of subordinate significance to the invention and will not therefore be described in detail.

Immediately when a mobile subscriber MS enters the service area of a mobile services switching centre, for instance MSC-2A in the network NW2, the location of the subscriber is registered in accordance with a preset procedure. Among other things, this procedure involves storing the number IMSI (International Mobile Station Identity) which unambiguously identifies the terminal and which is stored in the mobile terminal MS in the visitor location register GLR-2. This register now calls the home location register HLR-1 of the mobile terminal in the network NW1, using the IMSI-number as a pointer. Data MS-data and MS-key is collected from the paged data record and sent to GLR-2 for authentication of the visiting mobile station. An identification number PRN (Pursuit Routing Number) which discloses an address in the system number plan that clearly identifies this visitor location register GLR-2 is sent to the home location register HLR-1 in a MPA operation "Location Registration" together with IMSI for the mobile MS. There has now been created in HLR-1 a data record which contains a fixed link between the visitor location register GLR-2 and the subscriber MS. It is now possible to transmit an IAM message which contains all of the information PRN, IMSI, MSN that is required to address unambiguously the called mobile subscriber MS.

When a call arrives, for instance, from the fixed network PSTN in the form of an IAM message with the directory number MSN as the "Called Party Address", this call is directed to the gateway mobile services switching centre GMSC-1 in the network NW1 in which the subscriber MS belongs. The call is analyzed in the gateway mobile services switching centre GMSC-1, which sends a query concerning route information to the home location register HLR-1 with the MAP operation "Terminating Call Routing Retrieval" with the directory number MSN as a parameter. With the directory number MSN as a pointer, the subscriber identity number IMSI and the PRN-number of the visitor location register GLR-2 are collected from the data record of the called subscriber in HLR-1 and are sent back to the gateway mobile services switching centre GMSC-1 in a map message "Terminating Call Routing Retrieval ACK". The number PRN, the subscriber identity number IMSI and the directory number MSN are placed in an IAM-message in the gateway-GMSC in accordance with the ISUP protocol with the identification number PRN as the "Called Party Number" as described above. This message is used to set up the call between the gateway mobile services switching centre GMSC-1 and the gateway mobile services switching centre GMSC-2 in the network NW-2 in which the called subscriber roams. The identification number IMSI read from HLR-1 and sent from GMSC-1 in the IAM-message is used as a pointer to identify the called mobile unit MS in GLR-2.

If the register GLR-2 has lost the information in the data record to which the IMSI-number of the called subscriber attempts points, the message "not registered" is received instead of subscriber data. Normally, there is now obtained an error signal (the subscriber cannot be reached) and the call is released. According to the invention, an attempt is now made to reach the subscriber instead. Using the unique identity number IMSI of the called subscriber as a paging address, the visitor location register GLR-2 calls the subscriber's home location register HLR-1 with a MAP operation "query concerning subscriber data". Subscriber data, the authentication keys of the subscriber and of the mobile, and the HLR-1 number of the home location register in the system are returned to the register GLR in another MAP operation in "query concerning subscriber data acknowledged" and is stored in said register in a data record with the unique identity number IMSI as a pointer.

When the visitor location register GLR-2 has received data from the home location register HLR-1, global paging of the called subscriber is introduced via all base stations BSS within the area served by the visitor location register GLR-2. If the called subscriber is active, he will answer the call and a known authentication and channel allocation process, etc., will be initiated and lead to the establishment of a call connection between the calling and called subscribers.

Obviously, this paging of a subscriber over the whole area covered by the visitor location register GLR-2 will take some time to effect when paging involves a large number of mobile services switching centres within respective service areas. This is because a subscriber is not registered in the home location register until he passes the border of the area covered by a visitor location register GLR, normally a network. It is, of course, conceivable to register subscribers in the home location register HLR each time a roaming subscriber enters a new service area of a mobile services switching centre MSC. This would result, however, in an increase in the signalling load between the visitor location register GLR and the home location register HLR in all operational circumstances. Because calls to subscribers which are not registered in the visitor location register GLR occur relatively seldomly, it is necessary generally for such calls to accept the longer response time occasioned by the fact that paging is carried out over all mobile services switching centres that are connected with the called visitor location register GLR. The calling subscriber can be suitably informed of the expected delay, with the aid of a speech message to this effect.

Figure 2:
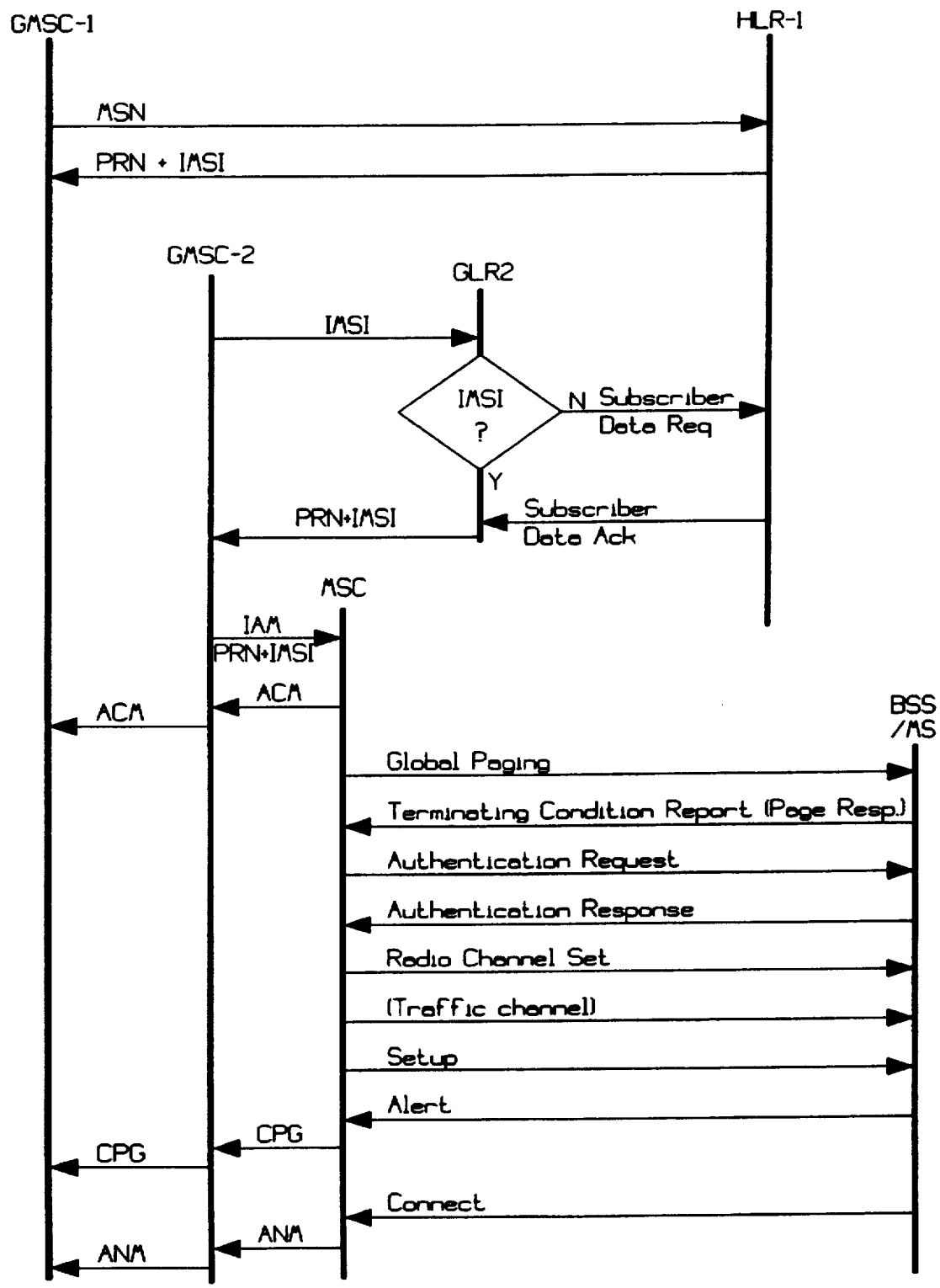
FIG. 2 is a signal flow sheet illustrating a successful call connection with a subscriber roaming in the service area of a visitor location register but not registered in the register as a visitor at the time of the call.

FIG. 2 is a signal flow sheet which illustrates the most essential operations that take place when the called subscriber is active. When an external call arrives at a gateway mobile services switching centre GMSC-1, the gateway looks in the home location register HLR-1 for the data record of this subscriber with the aid of the subscriber number. The gateway collects from the home location register the unique identity number IMSI of the called subscriber together with information relating to the number PRN of the visitor location register GLR in whose service area the mobile subscriber roams. PRN is now used as an address in an IAM-message which is sent to the network in which the called subscriber roams, as described in Swedish Patent Application 9300721-9. When the gateway mobile services switching centre GMSC-2 in this network receives the IAM-message, the unique subscriber number IMSI is extracted and used as a pointer to find the data record of this subscriber in the register GLR-2. If no such data record is found in the register GLR-2 in spite of the fact that when compiling the IAM-message, the home location register HLR-1 stated that this data record should be found in the register GLR-2, a MAP-message "Subscriber Data Request" is sent to the home location register HLR-1 with the unique identity number IMSI as the address. HLR-1 returns a MAP-message "Subscriber Data Request Ack" back to GLR-2. This MAP-message contains the subscriber data required to set up a connection, for instance keys for authenticating the subscriber and mobile telephone appratus. The address is also sent to the home location register HLR-1, which stores the number of the called subscriber. The data transmitted is stored in a data record in the register GLR-2 which can be reached with the unique identification number IMSI as a pointer. GMSC-2 sends a message ACM (Address Complete) back to the gateway mobile services switching centre GMSC-1. ACM means that all necessary information for setting up the connection is found in the visitor location register GLR.

Subsequent to having loaded the visitor location register GLR-2 with information concerning the called subscriber, there is normally started a global paging process over all base stations BSS within the whole of the area covered by respective mobile services switching centres MSC. If the called mobile telephone is active, it will reply with the message "Terminating Condition Report" in response to paging of the subscriber. A known authentication process is then initiated (Authentication Request and Authentication Response respectively) while using the information transmitted to the visitor location register GLR-2. If the called mobile telephone is accepted, channel setting, etc., is commanded in the messages "Radio Channel Set", "Traffic Channel" (possibly) and Setup. When the mobile telephone generates a tone signal to draw the attention of the called subscriber, an "Alert" signal is sent to the mobile services switching centre MSC, which in turn sends the signal CPG (Call Progress) to the gateway mobile services switching centre GMSC-1. When the mobile subscriber answers, the signal "Connect" is sent to the mobile services switching centre MSC, which in turn sends the signal ANM (Answer) to the calling network via the gateway mobile services switching centre GMSC-2 and the call connection is set up.

Figure 3:
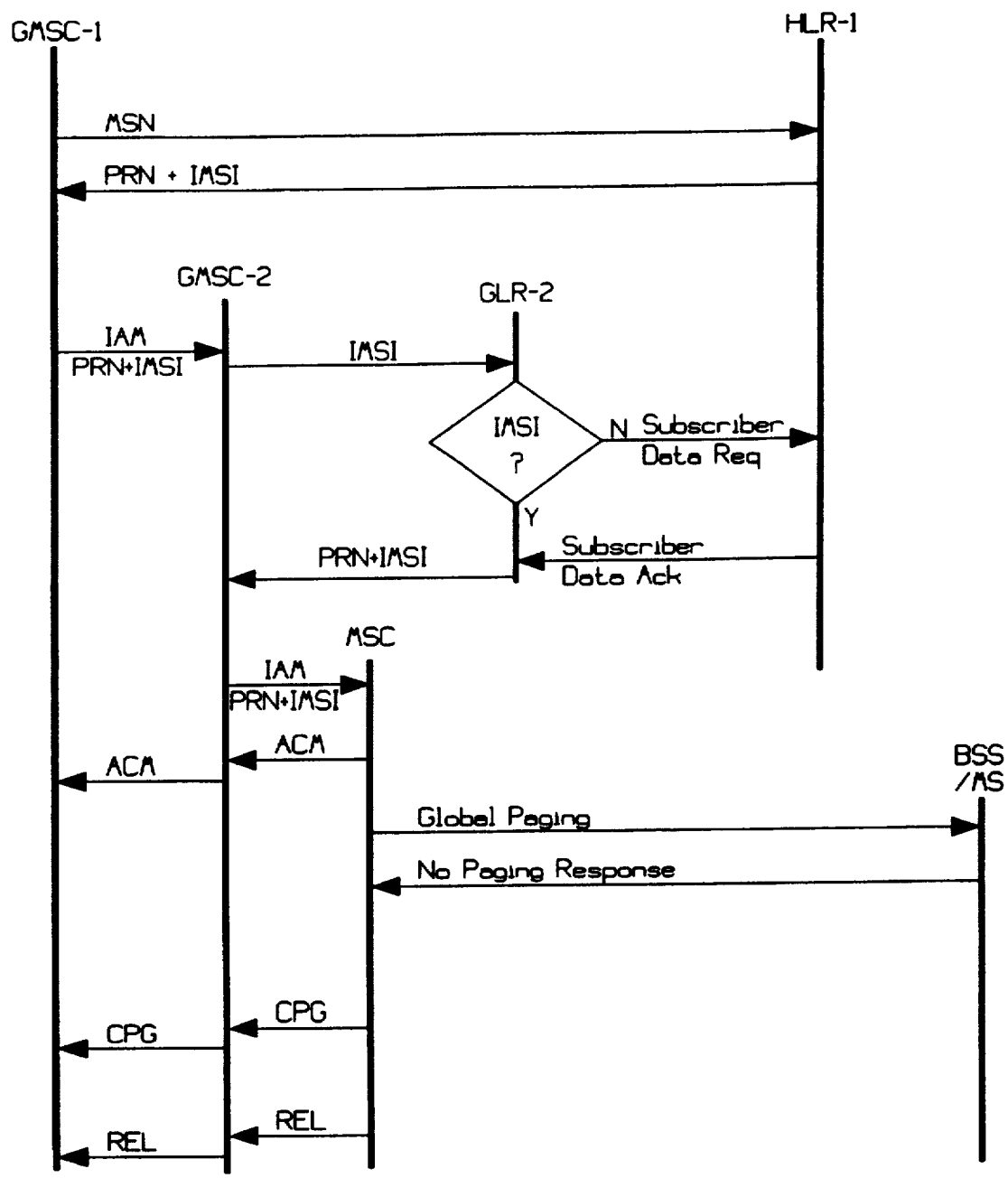
FIG. 3 is a signal flow sheet which illustrates an unsuccessful set up when a called subscriber does not respond to paging.

If the called mobile telephone is not active during the paging process and is therefore unable to answer within a set period of time, signalling takes place in accordance with the FIG. 3 illustration. If the global paging does not produce a result, the radio part BSS/MS will send the signal "No paging response" to the mobile services switching centre MSC, which then sends the messages CPG (Call Progress) and REL (Release) to the gateway mobile services switching centre GMSC-2 and also to the calling network and the call connection is released. The calling subscriber may optionally be sent a speech recorded message prior to aborting the call.

The aforedescribed method enables the number of unsuccessful calls to be reduced considerably, particularly when the visitor location register GLR has been subjected to a fault which has erased information concerning visiting subscribers or when such information concerning low traffic subscribers has been erased on purpose due to a shortage of memory sites in the register GLR at high traffic loads.

We claim:

1. A method for handling a call in a mobile telephone system whihc operates without temporary allocated roaming numbers in which a subscriber roaming in a network outside the subscriber's home network is called with a message which includes an address of a visitor location register which serves at least one mobile services switching center in the network in which the called subscriber roams, and further includes an identification number unique to the subscriber, despite the visitor location register's lacking called subscriber data that is required to connect the call, comprising the steps of:

collecting, in the visitor location register, data from a data record of the called subscriber stored in a home location register using the identification number as an address of the data record;

storing the collected data in the visitor location register;

paging the called subscriber; and if the called subscriber answers the paging, setting up the call.

2. The method of claim 1, wherein the address included in the message is stored in the home location register and contains solely the address of the visitor location register; and paging is carried out over all mobile services switching centers connected to the visitor location register.

3. The method of claim 1, wherein the address included in the message is stored in the home location register and contains both the address of the visitor location register and an address of a mobile services switching center within whose service area the called subscriber roams; and paging is carried out over only that mobile services switching center.

4. The method of claim 1, wherein the address included in the message and the identification number are collected from the data record of the called subscriber in the home location register in which the subscriber is registered.

5. The method of claim 1, wherein if the called subscriber does not answer the paging, the call is aborted.

6. The method of claim 1, wherein if the called subscriber does not answer the paging, a calling subscriber is sent a speech message that the called subscriber cannot be reached and that the call will be aborted.

7. In a mobile telephone system which operates without temporarily allocated roaming numbers in which a subscriber roaming in a network outside the subscriber's home network is called with a message which includes an address of a visitor location register which serves at least one mobile services switching center in the network in which the called subscriber roams, and further includes an identification number unique to the subscriber, despite the visitor location register's lacking called subscriber data that is required to connect the call, an apparatus for handling a call comprising:

means for collecting, in the visitor location register, data from a data record of the called subscriber stored in a home location register using the identification number as an address of the data record;

means for storing the collected data in the visitor location register;

means for paging the called subscriber; and means for setting up the call if the called subscriber answers the paging means.

8. The apparatus of claim 7, wherein the address included in the message is stored in the home location register and contains solely the address of the visitor location register; and the paging means pages the called subscriber over all mobile services switching centers connected to the visitor location register.

9. The apparatus of claim 7, wherein the address included in the message is stored in the home location register and contains both the address of the visitor location register and an address of a mobile services switching center within whose service area the called subscriber roams; and the paging means pages the called subscriber over only that mobile services switching center.

10. The apparatus of claim 7, wherein the collecting means collects the address of the visitor location register and the identification number from the data record of the called subscriber in the home location register in which the subscriber is registered.

11. The apparatus of claim 7, wherein if the called subscriber does not answer the paging means, the call is aborted.

12. The apparatus of claim 7, further comprising means for sending a speech message to a calling subscriber, wherein if the called subscriber does not answer the paging, the calling subscriber is sent a speech message that the called subscriber cannot be reached and that the call will be aborted.

13. A method for handling a call in a mobile telephone system which operates without temporarily allocated roaming numbers in which a subscriber roaming in a network outside the subscriber's home network is called with a message which includes an address of a visitor location register which serves at least one mobile switching center in the network in which the called subscriber roams, and further includes an identification number unique to the subscriber, comprising the steps of:

receiving a terminated call to the roaming subscriber at a gateway mobile switching center;

sending a mobile subscriber number to the home location register;

responding to the gateway switching center from the home location register with a mobile station with the unique identification number; and forwarding the call from the gateway mobile switching center to the visitor location register by means of the identification number, wherein after forwarding the call to the visitor location register, when the subscriber information is lacking in the visitor location register, collecting in the visitor location register, data from a data record of the called subscriber in the home location register using the identification number as an address of the data record.

* * * * *